INVENTORS
H.L. WALKER
G.A. MOYER
BY Young and Quigg
ATTORNEYS

United States Patent Office 3,364,124
Patented Jan. 16, 1968

3,364,124
FRACTIONAL DISTILLATION COLUMN HAVING CHANGING MULTI-LIQUID PATH FLOW
Harry L. Walker and Golden A. Moyer, Bartlesville, Okla., assignors to Phillips Petroleum Company, a corporation of Delaware
Filed Jan. 11, 1965, Ser. No. 424,690
12 Claims. (Cl. 202—158)

ABSTRACT OF THE DISCLOSURE

Fluid flow in a contacting column is changed to four-path flow by positioning in the column an arrangement of baffles and downcomers which will operate as a transition zone in passing fluid from a one-path or two-path fluid flow tray to a four-path fluid flow tray.

---

This invention relates to a method of and apparatus for distributing a fluid in a column. In one aspect, this invention relates to a method of and apparatus for changing a one-path fluid flow to a four-path fluid flow in a column. In another aspect, this invention relates to a method of and apparatus for changing a two-path fluid flow to a four-path fluid flow in a column.

The use of four-path fluid flow across the trays in a column is desirable because it results in a more intimate contact between the liquid on the trays and the vapors ascending through the column. The liquid passing across a four-path fluid tray does not travel as far on the surface of the tray to reach the point at which it is discharged from the tray. This shorter distance of travel prevents liquid from becoming stacked on a portion of the tray, thereby resulting in a better liquid and vapor contact over the entire surface of the tray.

The terminology which has evolved to describe the types of fluid flow across a tray in a column is descriptive in the sense that the number of paths indicates the number of different routes the fluid follows across the tray. For example, the flow of fluid on a tray which receives the fluid on one side and discharges it on the opposite side can be described as a one-path fluid flow because all of the fluid travels across the tray in one direction only. Similarly, the flow of fluid on a tray which receives the fluid at two points on opposite sides of the tray and discharges it in the middle can be described as two-path fluid flow because the fluid travels over two different routes to reach the point at which it is discharged. When a tray receives fluid at two points on opposite sides of the tray and in the middle of the tray, and discharges the fluid at two openings each of which is positioned between the middle and the sides of the tray, the fluid flow can be termed four-path because the fluid passes over the tray in four different paths during its travel to the discharge openings.

In some installations, it is desirable to employ one-path fluid flow whereas in other installations it is desirable to employ two-path or four-path fluid flow. In other installations it is desirable to employ one-path or two-path fluid flow in the upper regions of the column and four-path fluid flow in the lower regions of the column. One of the reasons for constructing a column so as to provide different paths of fluid flow in different regions of the column is that the column will accommodate more fluid in the four-path flow regions. This will allow additional fluid to be refined by introducing it into the column at a point where the fluid changes from one-path or two-path fluid flow to four-path fluid flow. The reason the four-path fluid flow regions will accommodate more fluid than the one-path or two-path fluid flow regions is that the fluid can be passed across the trays in the four-path fluid flow regions at a greater rate due to the construction of the trays which produces the four-path fluid flow.

According to this invention, a method and apparatus is provided for changing one-path or two-path fluid flow in a column to four-path fluid flow while the fluid passes downward through the column. This is accomplished by positioning an apparatus in the column which will function as a transition zone for passing fluid from a one-path or two-path fluid tray to a four-path fluid tray. The method and apparatus of this invention can be used in connection with a variety of different systems. For example, the apparatus of this invention can be used in gasoline plant rich oil deethanizers, dehexanizers in a refrigerated dry oil stripping plant, isomerization effluent strippers, and catalytic cracking effluent columns such as strippers, depropanizers or debutanizers.

Accordingly, it is an object of this invention to provide a method of and apparatus for distributing a fluid in a column.

Another object of this invention is to provide a method of and apparatus for changing one-path fluid flow to four-path fluid flow in a column.

Still another object of this invention is to provide a method of and apparatus for changing two-path fluid flow to four-path fluid flow in a column.

A further object of this invention is to provide a method and apparatus which will allow a column to accommodate increased volumes of fluid and yet effect a complete and thorough separation of said fluid.

These and other objects of the invention will become apparent to one skilled in the art after studying the detailed description, the appended claims, and the accompanying drawings in which:

Figures 1, 2:
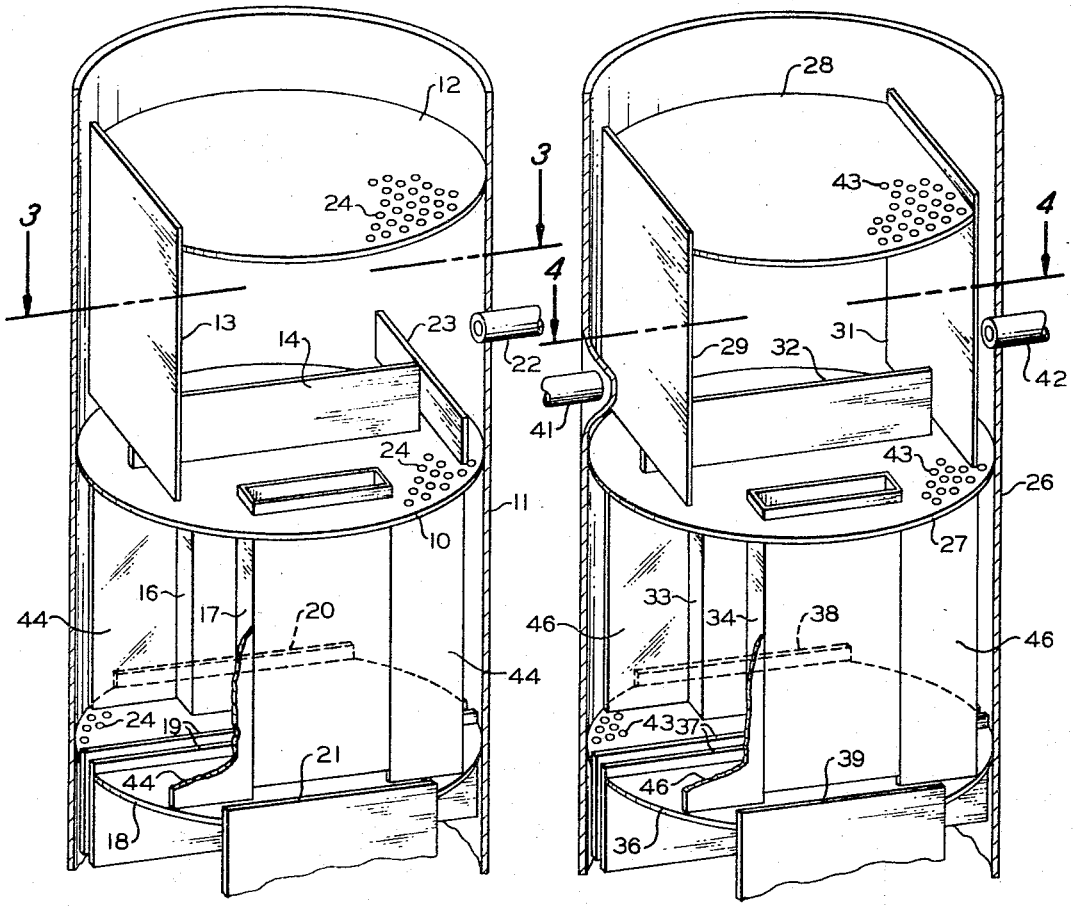
FIGURE 1 is a broken isometric view of a column showing the apparatus of this invention for changing one-path fluid flow to four-path fluid flow.
FIGURE 2 is a broken isometric view of a column showing the apparatus of this invention for changing two-path fluid flow to four-path fluid flow.
Figure 3:
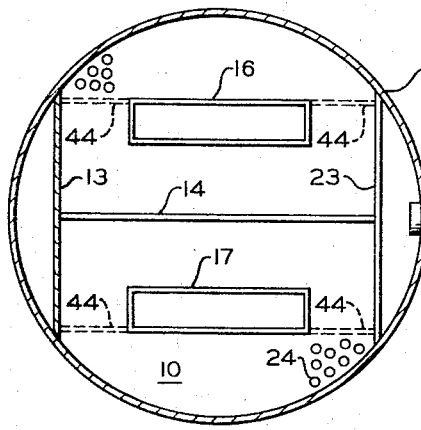
FIGURE 3 is a cross-section taken along the line 3—3 of FIGURE 1.

Referring now to the drawings wherein like reference numerals are used to denote like elements, and particularly to FIGURES 1 and 3, the novel apparatus of this invention includes a tray 10 positioned within a column 11 such that it will receive liquid passing downward in the column from an upper tray 12. A vertical plate 13 having its lower end spaced above tray 10 is attached to tray 12 and the interior surface of the column to form a passageway with the column which will serve to transmit liquid downward from tray 12 to tray 10. The upper end of plate 13 extends above the surface of the tray 12 so as to form a weir which will serve to maintain a layer of liquid on tray 12 at all times. Liquid passes onto tray 12 by means of a suitable downcomer or the like (not shown) positioned at the right side of tray 12 as viewed in FIGURE 1 of the drawings. When the level of liquid on tray 12 rises above the upper end of plate 13, it will spill over plate 13 and pass downward onto tray 10. Since the fluid travels across tray 12 in one direction only, it can be described as a one-path flow tray.

Although the column 11 is illustrated in FIGURE 1 of the drawing as having a uniform diameter over its entire length, it is apparent that the invention can be used in a column wherein the diameter of the upper portion of the column is less than the diameter of the lower portion. A column of this type will have a section which is in the shape of a frustrum of a cone. Tray 12 is positioned near the bottom of the smaller diameter portion of the column and tray 10 is positioned near the top of the larger diameter portion of the column. Plate 13 is secured to tray 12 and disposed within the column such that it is generally parallel with the sloping portion of the column. This type of column construction is generally preferred when additional fluids to be treated are introduced into the column because the increased diameter of the column will serve to accommodate the increased quantity of fluid.

An upright partition 14 secured to the upper surface of tray 10 serves to divide the liquid passing onto tray 10 into two separate and substantially equal streams. This will result in a uniform distribution of the liquid on the surface of tray 10. A pair of downcomers 16 and 17 of quadrilateral shape as viewed in horizontal cross-section are positioned on both sides of partition 14 such that their longest sides are parallel to the partition. The downcomers 16 and 17 will function to transmit liquid from tray 10 downward in the column to tray 18. The shape of the downcomers coupled with their position relative to partition 14 will result in a specified discharge of the liquid from the entire surface of tray 10 to each section of the surface of tray 18.

Tray 18 is provided with a downcomer 19, in substantially the same vertical plane as partition 14, and vertical plates 20 and 21 which define passageways with the interior surface of the column on opposite sides of the tray 18. The downcomer 19 and the passageways formed by plates 20 and 21 serve to transmit liquid from tray 18 downward through the column. Since the liquid discharged from downcomers 16 and 17 collects on tray 18 between plate 20 and downcomer 19 and between downcomer 19 and plate 21, respectively, it is apparent that tray 18 functions to establish four-path flow because the liquid flows over tray 18 in four different paths to reach the downcomer and the passageways. Trays similar in construction to tray 18 can then be used in the column below tray 18 to maintain four-path flow. That is, the next tray in the column below tray 18 is constructed such that its downcomers are positioned similar to the downcomers 16 and 17 of tray 10. It can thus be seen that the apparatus of this invention results in the formation of a transition zone in a column which changes one-path fluid flow to four-path fluid flow in a rapid and efficient manner.

The downcomers 16 and 17 extend downward from tray 10 at least to a point in horizontal alignment with the upper edges of plates 20 and 21. In some installations it may be desirable to allow the downcomers 16 and 17 to extend below the upper edges of plates 20 and 21. A plurality of vertical partitions 44, shown in broken elevation in FIGURE 1, are connected to downcomers 16 and 17 in the same plane as the outer sides of each of the downcomers. The partitions 44 extend from tray 18 upward through the column to tray 10 and outward into engagement with the inner surfaces of the column. The partitions 44 will serve to control the distribution of liquid on the surface of tray 18 in accordance with predetermined conditions as will be more fully hereinafter explained. As an alternate to the vertical partitions 44, the side surfaces of the downcomers 16 and 17 beneath tray 10 can be constructed to extend outward in a plane parallel with plates 20 and 21 into engagement with the inner surfaces of the column and upward from tray 18 to the bottom surface of tray 10. The downcomers 16 and 17 will then serve to distribute the liquid as desired on tray 18. Another modification of the downcomers 16 and 17 which is within the spirit and scope of this invention is to construct them such that their bottom ends extend completely across tray 18 in a plane parallel with plates 20 and 21 into contact with the inner surfaces of the column 11. The upper ends of the downcomers 16 and 17 are the same as that illustrated in FIGURE 1 of the drawing. In the latter modification of the downcomers, they will have a tapered configuration in the sense that the bottom ends of the downcomers are wider than the upper ends.

Since it is desirable to achieve a constant ratio of liquid to vapor throughout the surface of tray 18, a plurality of depending baffles can be attached at predetermined spaced intervals across the bottom edge of downcomers 16 and 17 in the same plane occupied by the partitions 44. Similarly, a plurality of vertically positioned baffles can be attached at spaced intervals to the upper edges of downcomer 19 and to the bottom surface of tray 10. The size and position of these baffles are selected to control the distribution of the liquid passing outward from the bottom of the downcomers 16 and 17 onto tray 18 to provide a constant ratio of liquid to ascending vapors throughout the entire surface of tray 18. That is, the ratio of the liquid passing from downcomer 16 to vertical plate 20 to the vapors ascending through tray 18 between downcomer 16 and plate 20 should be equal to the ratio of the liquid passing from downcomer 16 to downcomer 19 to the vapors ascending through tray 18 between downcomer 16 and downcomer 19. Similarly, the ratio of the liquid passing from downcomer 17 to vertical plate 21 to the vapors ascending through tray 18 between downcomer 17 and plate 21 should be equal to the ratio of the liquid passing from downcomer 17 to downcomer 19 to the vapors ascending through tray 18 between downcomer 17 and downcomer 19. This can be accomplished by positioning the baffles to provide a free-flowing space under the side of downcomer 16 adjacent plate 20 to equal the free-flowing space over the plate 20. The baffles can be attached to the upper edge of downcomer 19 adjacent downcomer 16 to provide a free-flowing space over the edge of downcomer 19 which is equal to the free-flowing space under the side of downcomer 16 adjacent downcomer 19. The sections of the downcomers and plates to be baffled is determined as described above. The exact position of the baffles on the edges of the downcomers and plates is such that the liquid flow from the downcomers will result in a uniform flow of liquid across the tray consistent with the constant liquid-to-vapor ratio. The baffles and their relative position with respect to the downcomers and vertical plates are adequately described in copending application Ser. No. 373,363 filed June 8, 1964.

The liquid capacity of the column is increased in accordance with this invention because the length of the upper edges of downcomer 19 and plates 20 and 21 is much greater than the length of the upper edge of the vertical plate 13. This allows fluid to be discharged from tray 18 at a greater rate than it is discharged from tray 12. Since it is desirable to pass liquid over the upper edge of plate 13 at a rate of about 5 gallons per minute per inch of edge, if the upper edges of the downcomer 19 and plates 20 and 21 are constructed such that their total length is four times the length of the upper edge of plate 13 the capacity of the column is increased by a factor of about four.

Since the liquid capacity of the column is increased as a result of changing from one-path flow to four-path flow, additional fluid to be treated can be introduced into the column by means of conduit 22. A weir 23 attached to partition 14 and the interior surface of the column on both sides of the partition will serve to define a reservoir for holding the additional fluid. This will allow vapors in the additional fluid to separate and pass upward through the column. The additional fluid will pass over the upper edge of weir 23 onto tray 10 whereupon it will pass downward through the column along with the other liquid on tray 10. Alternatively, the bottom edge of weir 23 can be spaced above the upper surface of tray 10. This is generally preferred when the additional fluid is partly vaporized. This permits vapor to separate from the fluid and rise over the top of weir 23 and the liquid to flow under weir 23 onto the tray 10. Although the additional fluid can be obtained from a variety of different sources, rich oil containing ethane, propane, butane, etc. can be rapidly and efficiently deethanized in this manner. The invention is particularly useful when the additional fluid contains relatively small amounts of ethane and most of the fluid passes downward through the column in the form of liquid whereupon it is removed as kettle products.

The trays 10, 12 and 18 are provided with a plurality of openings 24 of a size which will permit vapor to ascend through the column and yet will prevent liquid from passing downward through the openings. In some installations it may be desirable to provide each of the openings with a quarter-spherical or raised semi-spherical cap or the like. A modification of this type can obviously be made without departing from the spirit and scope of the invention.

Figure 4:
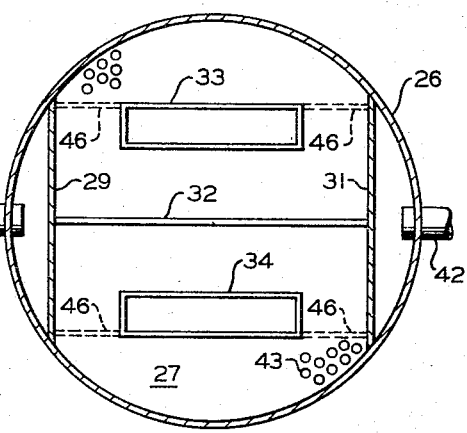
FIGURE 4 is a cross-section taken along the line 4—4 of FIGURE 2.

Referring to FIGURES 2 and 4 of the drawings, the invention will be described in connection with a column wherein two-path fluid flow is changed to four-path fluid flow. A column 26 is provided with a tray 27 positioned to receive liquid from an upper tray 28. The upper tray 28 is provided with a pair of oppositely disposed vertical plates 29 and 31 which define passageways with the interior surface of the column. Liquid received in the middle of tray 28 will flow in opposite directions across tray 28, downward through the passageways formed by plates 29 and 31, and onto tray 27. An upright partition 32 secured to the upper surface of tray 27 will serve to divide the liquid passing across tray 27 into two separate streams of substantially equal volume. A pair of downcomers 33 and 34 of quadrilateral shape as viewed in horizontal cross-section are positioned vertically through tray 27 on each side of partition 32 such that their longest sides are parallel to the partition. The downcomers 33 and 34 will serve to transmit fluid from tray 27 downward through the column to tray 36. Although the downcomers 33 and 34 can be constructed circular or the like, it was discovered that by utilizing quadrilateral-shaped downcomers, positioned relative to the partition in the manner described, a specified discharge of liquid from the entire surface of tray 28 to the entire surface of tray 36 can be achieved.

Column 26 can be constructed with a smaller diameter upper portion and a larger diameter lower portion similar to that described in connection with the alternate column construction of column 11 illustrated in FIGURE 1 of the drawing. When the column is constructed with this shape, tray 28 is positioned near the bottom of the smaller diameter portion of the column and tray 27 is positioned near the top of the large diameter portion of the column. Plates 29 and 31 are connected to tray 28 and disposed within the column in a plane generally parallel with the sloping sides of the column.

Tray 36 is provided with a transversely positioned downcomer 37, in the same vertical plane as partition 32, and oppositely disposed vertical plates 38 and 39 which define vertical passageways with the interior surface of the column. The downcomer 37 and the passageways formed by plates 38 and 39 will serve to establish four-path fluid flow on tray 36 in the same manner as that described in connection with the fluid flow in the column illustrated by FIGURES 1 and 3 of the drawings. Trays similar in construction to trays 27 and 36 are alternately positioned beneath tray 36 in the column to maintain four-path flow across the several trays as the fluid descends to the bottom of the column.

The downcomers 33 and 34 are constructed and positioned such that their lower ends extend downward through the column at least to a point in horizontal alignment with the upper edges of vertical plates 38 and 39. A plurality of vertical partitions 46, shown in broken elevation in FIGURE 2, are connected to the downcomers 33 and 34 in the same plane as the outer sides of each downcomer. The partitions 46 extend from tray 36 upward into engagement with tray 27 and outward into contact with the inner surface of the column. The partitions 46 will serve to control the distribution of the liquid on tray 36 as will be more fully hereinafter explained. A plurality of baffles can be secured in depending fashion at spaced intervals along the outer sides and bottom of downcomers 33 and 34 and at spaced intervals along the upper edges of downcomer 37 to provide the constant ratio of liquid to ascending vapors on all portions of the tray 36 in a manner similar to the baffles described in connection with the embodiment illustrated by FIGURE 1 of the drawing.

Although the downcomers 33 and 34 are illustrated by FIGURE 2 as having a uniform quadrilateral cross-section, it is within the spirit and scope of this invention to extend the sides of the downcomers which are parallel with plates 38 and 39 outward into contact with the inner surfaces of column 26 beneath tray 27 thereby eliminating the need for the partitions 46. It is also within the scope of this invention to extend the bottom of the downcomers 33 and 34 outward into engagement with the inner surfaces of the column 26 such that the downcomers have a tapered configuration.

The liquid capacity of column 26 is increased by this invention because the length of the upper edges of downcomer 37 and plates 38 and 39 is greater than the length of the upper edges of vertical plates 29 and 31. This causes liquid to be discharged from tray 36 at a greater rate than it is discharged from tray 28. Since it is desirable to pass fluid over the upper edges of plates 29 and 31 at a rate of about 5 gallons per minute per inch of edge, if the upper edges of the downcomer 37 and plates 38 and 39 are constructed such that their total length is twice the total length of the upper edges of plates 29 and 31, the capacity of the column is increased by a factor of about two.

Since the fluid capacity of column 26 is increased by changing from a two-path to a four-path fluid flow, additional fluid can be introduced into the column for treatment by means of conduits 41 and 42. Conduits 41 and 42 are positioned through column 26 such that the fluid introduced will be admixed and passed downward with the liquid passing from tray 28 to tray 27. The fluid introduced in this manner can be a rich oil containing ethane, propane, butane, etc., which can be stripped of ethane while passing through the column.

The trays 27, 28 and 36 are provided with a plurality of openings 43 which will serve to allow vapors to ascend through the column. These openings can be provided with caps or the like of a type well known in the art.

Although the invention has been described showing one downcomer on each side of the upright partitions 14 and 32, it is apparent that two or more downcomers can be used on both sides of the partitions for passing liquid from trays 10 and 27.

Although the invention has been described in considerable detail for the purpose of illustration, it is to be understood that such detail is for that purpose only and that many variations and modifications can be made without departing from the spirit and scope of the invention.

We claim:

1. In a fractional distillation column, the combination of: a first tray for receiving liquid passing downward through said column; a second tray positioned beneath said first tray for receiving liquid from said first tray; a substantially upright partition carried by said first tray for distributing liquid on the upper surface thereof, said partition being positioned across said first tray such that the ends of said partition are spaced from the interior wall surface of said column; first downcomer means in said first tray on one side of said partition for passing liquid from said first tray to said second tray; second downcomer means in said first tray on the other side of said partition for passing liquid from said first tray to said second tray; means positioned within said column above said first tray for passing liquid onto said first tray; a third downcomer centrally disposed across said second tray in substantially the same vertical plane as that occupied by said upright partition in said first tray; a first vertical plate parallel with and spaced from one side of said third downcomer for defining a first vertical passageway with the interior wall surface of said column; and a second vertical plate parallel with and spaced from the other side of said third downcomer for defining a second vertical passageway with the interior wall surface of said column.

2. Apparatus according to claim 1 wherein said means for passing liquid downward through said column onto said first tray includes a vertical plate spaced above said first tray and connected to one end of said partition and the interior wall surface of said column on both sides of said partition.

3. Apparatus according to claim 1 wherein said means for passing liquid downward through said column onto said first tray includes a first vertical plate spaced above said first tray and connected to one end of said partition and the interior wall surface of said column on both sides of said partition; and a second vertical plate spaced above said first tray and connected to the other end of said partition and the interior wall surface of said column on both sides of said partition.

4. Apparatus according to claim 3 wherein said column is provided with means for introducing a fluid into said column between said first and second vertical plates and the interior wall surface of said column into admixture with the liquid passing downward through said column onto said first tray.

5. Apparatus according to claim 2 wherein said partition is provided with a weir attached to the opposite end of said partition and the interior surface of said column on both sides of said partition; and said column is provided with means for introducing a fluid into said column between said weir and the interior surface of said column.

6. Apparatus according to claim 5 wherein said weir is spaced above said tray.

7. In a fractional distillation column, apparatus for changing the liquid path flow from one of (a) one-path liquid flow and (b) two-path liquid flow to four-path liquid flow, said apparatus comprising, in combination: a substantially horizontal first tray for receiving liquid passing downward through said column; a substantially horizontal second tray positioned beneath said first tray for receiving liquid from said first tray; a substantially upright partition carried by said first tray for distributing liquid on the upper surface thereof, said partition being positioned across said tray such that the ends of said partition are spaced from the interior surface of said column; at least one downcomer positioned in said first tray between one side of said partition and the interior surface of said column for passing liquid from said first tray downward onto said second tray; at least one other downcomer positioned in said first tray between the other side of said partition and the interior surface of said column for passing liquid from said first tray downward onto said second tray; first, second, and third downcomer means positioned in said second tray for passing liquid downward from said second tray; said first downcomer means being centrally disposed across said second tray in substantially the same vertical plane as that occupied by said upright partition in said first tray; said second downcomer means being disposed on one side of said centrally disposed first downcomer means and adjacent a first section of the interior wall surface of said column; and said third downcomer means being disposed on the other side of said centrally disposed first downcomer means and adjacent a second section of the interior wall surface which is opposite said first section of interior wall surface.

8. Apparatus according to claim 7 wherein said means for passing liquid downward through said column onto said first tray includes a vertical plate spaced above said first tray and connected to one end of said partition and the interior surface of said column on both sides of said partition.

9. Apparatus according to claim 7 wherein said means for passing liquid downward through said column onto said first tray includes a first vertical plate spaced above said first tray and connected to one end of said partition and the interior surface of said column on both sides of said partition; and a second vertical plate spaced above said first tray and connected to the other end of said partition and the interior surface of said column on both sides of said partition.

10. Apparatus according to claim 9 wherein said column is provided with means for introducing a fluid into admixture with said fluid passing downward through said column onto said first tray.

11. Apparatus according to claim 8 wherein said partition is provided with a weir attached to the opposite end of said partition and the interior surface of said column on both sides of said partition; and said column is provided with means for introducing a fluid into said column between said weir and the interior surface of said column.

12. Apparatus according to claim 11 wherein said weir is spaced above said first tray.

References Cited

UNITED STATES PATENTS

| | | | |
|---|---|---|---|
| 1,811,247 | 6/1931 | Smith | 261—114 |
| 1,938,247 | 12/1933 | Collins | 261—114 |
| 2,045,518 | 6/1936 | Chatfield | 261—114 |
| 2,202,071 | 5/1940 | Van Dongen et al. | 261—114 |
| 2,327,993 | 8/1943 | Bragg | 261—114 |
| 2,646,977 | 7/1953 | Kraft | 202—158 X |
| 2,973,189 | 2/1961 | Chin Chu | 202—158 X |
| 3,053,521 | 9/1962 | Plaster et al. | 202—158 X |
| 3,162,700 | 12/1964 | Irons | 261—114 |

FOREIGN PATENTS

| | | |
|---|---|---|
| 541,010 | 5/1957 | Canada. |
| 1,010,502 | 6/1957 | Germany. |

NORMAN YUDKOFF, *Primary Examiner.*

F. E. DRUMMOND, *Assistant Examiner.*